(12) United States Patent
Dixon et al.

(10) Patent No.: US 9,106,585 B1
(45) Date of Patent: Aug. 11, 2015

(54) RECEIVING A DOCUMENT FROM A CUSTOMER

(75) Inventors: David Patrick Dixon, San Antonio, TX (US); Jeffrey William Gallagher, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 766 days.

(21) Appl. No.: 13/253,581

(22) Filed: Oct. 5, 2011

(51) Int. Cl.
H04L 12/24 (2006.01)

(52) U.S. Cl.
CPC ........ H04L 41/5074 (2013.01); H04L 41/5064 (2013.01)

(58) Field of Classification Search
CPC . H04L 41/5074; H04L 41/5096; H04L 51/14; H04L 41/5064; H04L 51/22
USPC .......................................... 709/205, 217, 206
See application file for complete search history.

(56) References Cited

U.S. PATENT DOCUMENTS

| | | | | |
|---|---|---|---|---|
| 6,356,633 | B1 * | 3/2002 | Armstrong | 379/265.11 |
| 7,478,239 | B1 * | 1/2009 | Rosen | 713/172 |
| 7,664,697 | B2 * | 2/2010 | Takayama | 705/39 |
| 7,831,465 | B2 * | 11/2010 | Hoff | 705/7.31 |
| 8,131,577 | B2 * | 3/2012 | Lessing et al. | 705/7.11 |
| 8,200,231 | B2 * | 6/2012 | Gonen et al. | 455/445 |
| 8,396,203 | B2 * | 3/2013 | Yasrebi et al. | 379/265.01 |
| 8,589,213 | B2 * | 11/2013 | Loveday et al. | 705/7.38 |
| 8,589,489 | B2 * | 11/2013 | Bomgaars et al. | 709/205 |
| 2004/0105118 | A1 | 6/2004 | El-Gazzar et al. | |
| 2005/0063005 | A1 | 3/2005 | Phillips et al. | |
| 2006/0242404 | A1 | 10/2006 | Su | |
| 2007/0220614 | A1 | 9/2007 | Ellis et al. | |
| 2009/0164781 | A1 | 6/2009 | Bouchard | |

OTHER PUBLICATIONS

"Active Messenger: filtering and delivery in a heterogeneous network" [Retrieved on Feb. 5, 2011], Retrieved from the Internet <URL: http://citeseerx.ist.psu.edu/viewdoc/download?doi=10.1.1.3.6861&rep=rep1&type=pdf>.

* cited by examiner

*Primary Examiner* — Kristie Shingles
(74) *Attorney, Agent, or Firm* — Fish & Richardson P.C.

(57) ABSTRACT

The present disclosure describes receiving a document from a customer. One or more embodiments include a memory and a processor configured to execute executable instructions stored in the memory to receive, in a one-way inbox account associated with a number of customer service representatives, a communication from a customer, wherein the communication includes a document and identification information associated with one of the number of customer service representatives, and transfer the communication from the one-way inbox account to an inbox associated with the one of the number of customer service representatives based, at least partially, on the identification information.

15 Claims, 3 Drawing Sheets

RECEIVING A DOCUMENT FROM A CUSTOMER

BACKGROUND

A transaction between a customer and a financial institution (e.g., a bank, insurance company, credit provider, financial planning company, investment firm, etc.), may include a telephone call between the customer and a customer service representative of the financial institution. During the telephone call, the customer and the customer service representative may discuss information associated with the transaction such as, for instance, information (e.g., financial and/or demographic information) about the customer, information about the product(s) and/or service(s) that is the subject of the transaction (e.g., the cost, terms, benefits, and/or risks of the product(s) or service(s)), information about similar product(s) and/or service(s) offered by other (e.g., competitor) financial institutions (e.g., the cost, terms, benefits, and/or risks of the product(s) and/or service(s) offered by other financial institutions), and/or information about other products and/or services of the financial institution the customer may be presently and/or have previously obtained (e.g., information from other accounts the customer may presently have and/or previously had with the financial institution).

In some instances, the customer may also send a number of documents (e.g., faxes, electronic files, emails, etc.) having information associated with the transaction to the customer service representative. However, in previous approaches, the customer may not be able to send the documents to the customer service representative until after the telephone call between the customer and the customer service representative is completed. For example, the customer may have to wait for the telephone call to end, and then log in to a website of the financial institution and use a slow and cumbersome one-to-one email process in which the customer must manually attach each document to be sent to the customer service representative. Further, because the customer service representative is no longer on the phone with the customer, the customer service representative may not be able to discuss (e.g., ask questions about and/or clarify) the documents with the customer. Accordingly, such previous approaches may increase the length and/or difficulty of the transaction

DETAILED DESCRIPTION

The present disclosure describes receiving a document from a customer. One or more embodiments include a memory and a processor configured to execute executable instructions stored in the memory to receive, in a one-way inbox account associated with a number of customer service representatives, a communication from a customer, wherein the communication includes a document and identification information associated with one of the number of customer service representatives, and transfer the communication from the one-way inbox account to an inbox associated with the one of the number of customer service representatives based, at least partially, on the identification information.

In a number of embodiments of the present disclosure, a customer may be able to send a document associated with a transaction to a customer service representative and/or the customer service representative may be able to receive the document from the customer while the customer and the customer service representative are conducting a telephone call with each other (e.g., a telephone call to discuss the transaction). Accordingly, receiving the document from the customer in accordance with one or more embodiments of the present disclosure may decrease the length and/or difficulty of the transaction, as compared with previous approaches. For example, the customer service representative may be able to discuss (e.g., ask questions about and/or clarify) the documents with the customer during the telephone call.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of customer service representatives" can refer to one or more customer service representatives. Additionally, the designator "N" as used herein, particularly with respect to reference numerals in the drawings, indicates that a number of the particular feature so designated can be included with a number of embodiments of the present disclosure.

Figure 1:
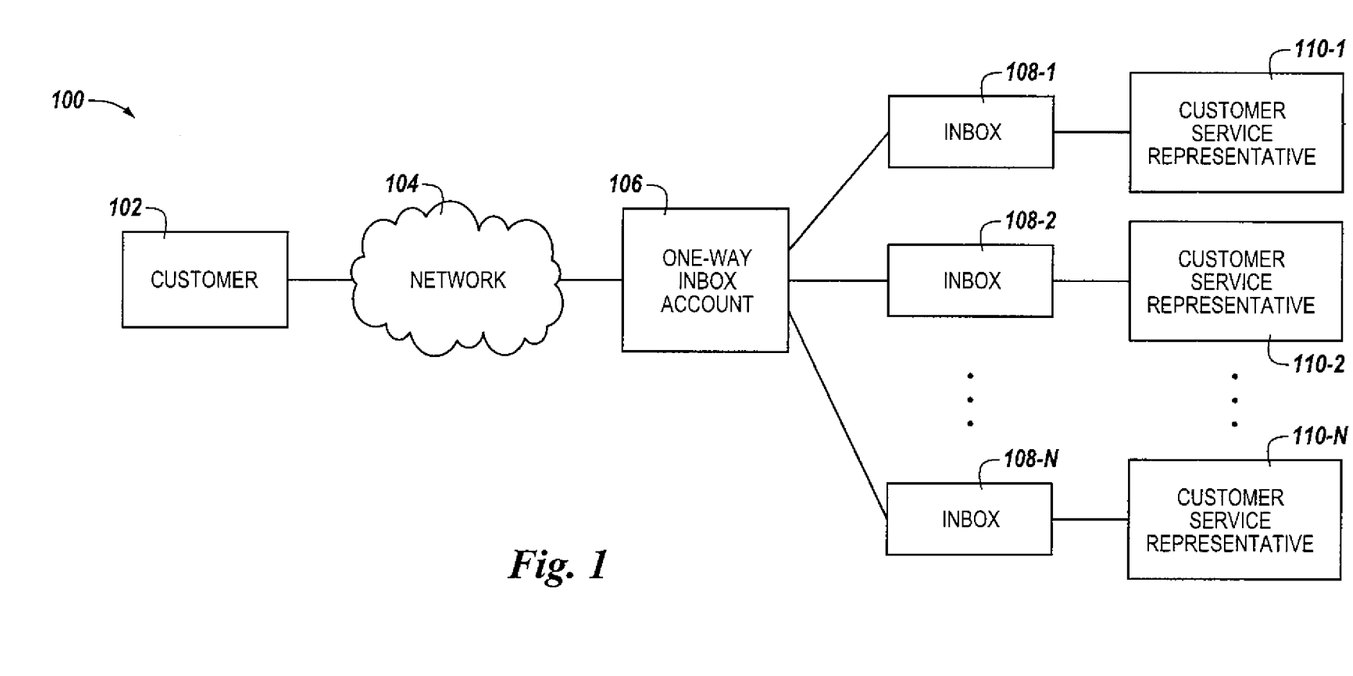
FIG. 1 illustrates a system for receiving a document from a customer in accordance with one or more embodiments of the present disclosure.

FIG. 1 illustrates a system 100 for receiving a document from a customer (e.g., customer 102) in accordance with one or more embodiments of the present disclosure. The document can be, for example, a fax, electronic file (e.g., photograph), and/or email having information associated with a transaction (e.g., a financial transaction), as will be further described herein.

As shown in FIG. 1, system 100 includes a customer 102 (e.g., a device associated with customer 102). The device associated with customer 102 can be, for example, any device capable of sending emails or other electronic messages. For instance, the device associated with customer 102 can be a mobile device (e.g., a mobile phone, a smart phone, a personal digital assistant (PDA), a smart device, etc.), a laptop computer, a desktop computer, a fax machine, and/or a landline telephone, among other types of communication devices.

As shown in FIG. 1, system 100 includes a number of customer service representatives 110-1, 110-2, . . . , 110-N (e.g., a different device associated with each customer service representative). The device associated with a customer service representative can be, for example, a computing device (e.g., a laptop or desktop computer), a fax machine, and/or a landline telephone, among other types of communication devices. For instance, the device associated with a customer service representative can be computing device 330 further described herein (e.g., in connection with FIG. 3).

Customer service representatives 110-1, 110-2, . . . , 110-N can be, for example, a group of customer service representatives of a particular entity, such as a financial institution (e.g., a bank, insurance company, credit provider, financial planning company, investment firm, etc.). In some embodiments, customer service representatives 110-1, 110-2, . . . , 110-N can be located at a call center of the financial institution.

In some embodiments, customer service representatives 110-1, 110-2, . . . , 110-N (e.g., the devices associated with the customer service representatives) can have access to a location, such as, for instance, a database (not shown in FIG. 1), where documents are stored. The documents stored in the location may include, for example, information associated with (e.g., provided by) customers of the entity, and the documents may be stored in the location according to identification information (e.g., names and/or customer numbers) associated with the customers. Accordingly, customer service representatives 110-1, 110-2, . . . , 110-N can access (e.g., find) information provided (e.g., previously provided) by a customer (e.g., customer 102).

As shown in FIG. 1, system 100 includes a number of inboxes 108-1, 108-2, . . . , 108-N associated with (e.g., accessible by) customer service representatives 110-1, 110-2, . . . , 110-N. In the embodiment illustrated in FIG. 1, each inbox 108-1, 108-2, . . . , 108-N is associated with a different customer service representative. For example, as illustrated in FIG. 1, inbox 108-1 is associated with customer service representative 110-1 (e.g., inbox 108-1 is associated only with customer service representative 110-1 and not with any other customer service representative), inbox 108-2 is associated with customer service representative 110-2 (e.g., inbox 108-2 is associated only with customer service representative 110-2 and not with any other customer service representative), etc. That is, inboxes 108-1, 108-2, . . . , 108-N can be individual inbox accounts.

Inboxes 108-1, 108-2, . . . , 108-N can send and/or receive communications (e.g., emails and/or faxes), and customer service representatives 110-1, 110-2, . . . , 110-N can access the sent and/or received communications. That is, inboxes 108-1, 108-2, . . . , 108-N can be, for example, email and/or fax inboxes. As an additional example, inboxes 108-1, 108-2, . . . , 108-N can be central locations for storing and/or indexing documents and/or information provided to customer service representatives 110-1, 110-2, . . . , 110-N (e.g., by a customer such as customer 102). Customer service representatives 110-1, 110-2, . . . , 110-N can access (e.g., find) and/or reference the documents and/or information in inboxes 108-1, 108-2, . . . , 108-N.

As shown in FIG. 1, system 100 includes a one-way inbox account 106 associated with (e.g., accessible by) customer service representatives 110-1, 110-2, . . . , 110-N. In the embodiment illustrated in FIG. 1, one-way inbox account 106 is associated with each customer service representative 110-1, 110-2, . . . , 110-N. That is, one-way inbox account 106 can be a group inbox account.

One-way inbox account 106 can receive communications (e.g., emails and/or faxes) from customers (e.g., customer 102, as will be further described herein), and customer service representatives 110-1, 110-2, . . . , 110-N can access the received communications. However, one-way inbox account 106 may not be able to send communications to customers. That is, one-way inbox account 106 can be, for example, a one-way email and/or fax inbox account.

In some embodiments, customer 102 and one of customer service representatives 110-1, 110-2, . . . , 110-N (e.g., customer service representative 110) may be conducting a telephone call with each other as part of a transaction between customer 102 and the financial institution. During the telephone call, customer 102 and customer service representative 110-1 may discuss information associated with the transaction such as, for instance, information (e.g., financial and/or demographical information) about customer 102, information about the product(s) and/or service(s) that is the subject of the transaction (e.g., the cost, terms, benefits, and/or risks of the product(s) or service(s)), information about similar product(s) and/or service(s) offered by other (e.g., competitor) financial institutions (e.g., the cost, terms, benefits, and/or risks of the product(s) and/or service(s) offered by other financial institutions), and/or information about other products and/or services of the financial institution customer 102 may be presently and/or have previously obtained (e.g., information from other accounts customer 102 may presently have and/or previously had with the financial institution).

In some instances, customer 102 may need to send a document having information associated with the transaction to customer service representative 110-1. The document may be, for example, a fax, an electronic file (e.g., an electronic file stored on the device associated with customer 102 or a photograph taken by the device associated with customer 102), and/or an email (e.g., an email previously received by customer 102). As an example, the document may include a quote for a similar product or service provided to customer 102 by a different financial institution, or be a document from an account that customer 102 may presently have and/or previously had with the financial institution). However, embodiments of the present disclosure are not limited to a particular type of document.

In such instances, customer service representative 110-1 can provide identification information associated with customer service representative 110-1 and/or identification information associated with one-way inbox account 106 to customer 102 (e.g., to the device associated with customer 102). Customer service representative 110-1 can provide the identification information to customer 102 while customer 102 and customer service representative 110-1 are conducting the telephone call with each other. For example, customer service representative 110-1 can email the identification information to customer 102, fax the identification information to customer 102, and/or provide the identification information to customer 102 by voice during the telephone call.

The identification information associated with customer service representative 110-1 can be unique identification information associated with customer service representative 110-1. For example, the identification information associated with customer service representative 110-1 can include all or a portion of the name of customer service representative 110-1, and/or a routing code associated with customer service representative 110-1. The routing code can be based on, for example, the product(s) and/or service(s) (e.g., the type(s) of product(s) and/or service(s)) provided by customer service representative 110-1 (e.g., to customer 102), and/or the type of the document (e.g., the type of product(s) and/or service(s) associated with the document).

In some embodiments (e.g., embodiments in which one-way inbox account 106 is a one-way email inbox account), the identification information associated with one-way inbox account 106 can include an email address associated with one-way inbox account 106. In some embodiments (e.g., embodiments in which one-way inbox account 106 is a one-way fax inbox account), the identification information associated with one-way inbox account 106 can include a fax number associated with one-way inbox account 106.

Upon receiving the identification information associated with customer service representative 110-1 and/or the identification information associated with one-way inbox account 106, customer 102 can send (e.g., transmit) a communication to one-way inbox account 106 (e.g., using the identification information associated with one-way inbox account 106). That is, the communication sent by customer 102 can be received (e.g., from the device associated with customer 102) in one-way inbox account 106 (e.g., while customer 102 and customer service representative 110-1 are conducting the telephone call with each other). The communication can include the document having the information associated with the transaction, the identification information associated with customer service representative 110-1 (e.g., in a subject field of the communication), and/or the identification information associated with one-way inbox account 106 (e.g., to address the communication to one-way inbox account 106).

In some embodiments (e.g., embodiments in which one-way inbox account 106 is a one-way email inbox account), the communication can be an email. The email may be received in one-way inbox account 106 approximately one to ten seconds after the email is sent from the device associated with customer 102.

In some embodiments (e.g., embodiments in which one-way inbox account 106 is a one-way fax inbox account), the communication can be a fax. As an example, the fax can be sent from a fax machine by customer 102, processed using inbound fax processing software, and routed as a .pdf file to one-way inbox account 106. The fax may be received in one-way inbox account 106 approximately 45-55 seconds after the fax is sent by customer 102.

Customer 102 can send the communication to one-way inbox account 106, and one-way inbox account 106 can receive the communication from customer 102, via a network 110, as illustrated in FIG. 1. Network 110, can be, for example, a wide area network (WAN) such as the Internet, a local area network (LAN), a personal area network (PAN), a campus area network (CAN), or metropolitan area network (MAN), among other types of networks.

As used herein, a "network" (e.g., network 110) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations.

A network (e.g., network 110) may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

After one-way inbox account 106 receives the communication, the communication (e.g., the document included in the communication) can be transferred from one-way inbox account 106 to the individual inbox associated with customer service representative 110-1 (e.g., inbox 108-1) based, at least partially, on the identification information associated with customer service representative 110-1 included in the communication. The communication can be transferred from one-way inbox account 106 to inbox 108-1 while customer 102 and customer service representative 110-1 are conducting the telephone call with each other. Customer service representative 110-1 can then view the document included in the communication and/or discuss (e.g., ask questions about and/or clarify) the document with customer 102 during the telephone call.

As an example, customer service representative 110-1 can transfer the communication from one-way inbox account 106 to inbox 108-1 based, at least partially, on the identification information associated with customer service representative 110-1 included in the communication. For instance, customer service representative 110-1 can view one-way inbox account 106, and see that the communication has been received (e.g., has arrived) in one-way inbox account 106, using the device associated with customer service representative 110-1 (e.g., on a display of the device). Upon recognizing that the communication includes the identification information associated with himself or herself (e.g., his or her name), customer service representative 110-1 can manually transfer the communication to inbox 108-1 (e.g., instruct the communication to be transferred to inbox 108-1).

As an additional example, the communication can be automatically transferred (e.g., without any additional instructions and/or input from customer service representative 110-1) from one-way inbox account 106 to inbox 108-1 based, at least partially, on the identification information associated with customer service representative 110-1 included in the communication. For instance, when the communication is received in one-way inbox account 106, inbound processing software associated with one-way inbox account 106 can extract (e.g., scrub) the identification information (e.g., the routing code) associated with customer service representative 110-1 out of the communication (e.g., out of the subject field of the communication), identify that the identification information is associated with customer service representative 110-1, and route the communication directly to inbox 108-1.

In some embodiments, inbox 108-1 can notify customer service representative 110-1 that the communication has been received from one-way inbox account 106. For example, inbox 108-1 can send a notification message (e.g., "you have mail") to customer service representative 110-1 upon receiving the communication from one-way inbox account 106.

In some embodiments, the identification information (e.g., routing code) associated with customer service representative 110-1 may also be associated with one or more additional customer service representatives (e.g., one or more of customer service representatives 110-2, . . . , 110-N). For example, the routing code may also be associated with other customer service representatives that can provide products and/or services related to the product(s) and/or service(s) that is the subject of the transaction. In such embodiments, the communication can be automatically transferred from one-way inbox account 106 to individual inboxes associated with the additional customer service representatives (e.g., inboxes 108-2, . . . , 108-N) based, at least partially, on the routing code. Such an automatic transfer of the communication can eliminate the need for customer service representative 110-1 to manually perform such a transfer, thereby reducing the amount of work for customer service representative 110-1.

In some embodiments, the identification information (e.g., routing code) associated with customer service representative 110-1 may also be associated with a particular department(s) of the financial institution. For example, the routing code may also be associated with a department(s) of the financial institution that is related to the product(s) and/or service(s) that is the subject of the transaction. In such embodiments, the communication can be automatically transferred from one-way inbox account 106 to an inbox associated with the particular department(s) based, at least partially, on the routing code. Such an automatic transfer of the communication can eliminate the need for customer service representative 110-1 to manually perform such a transfer, thereby reducing the amount of work for customer service representative 110-1.

In some embodiments, the communication can be automatically saved (e.g., in a folder and/or process associated with customer service representative 110-1) based, at least partially, on the identification information (e.g., routing code) associated with customer service representative 110-1. Such an automatic saving of the communication can eliminate the need for customer service representative 110-1 to manually perform such a save, thereby reducing the amount of work for customer service representative 110-1.

In some embodiments, customer 102 (e.g., the device associated with customer 102) can be authenticated by customer service representative 110-1 (e.g., by the device associated with customer service representative 110-1) before customer 102 sends the communication to one-way inbox account 106. For example, customer 102 can send identification information (e.g., a customer number) associated with himself or herself to customer service representative 110-1, and customer service representative 110-1 can receive the identification information associated with customer 102 and authenticate customer 102, based, at least partially, on the identification information.

After customer 102 is authenticated, customer 102 can send the communication to one-way inbox account 106, and the communication can be automatically transferred from one-way inbox account 106 to inbox 108-1 based, at least partially, on the authentication of customer 102. For example, once customer 102 is authenticated, the identification information associated with customer 102 may reside on both the device associated with customer 102 and the device associated customer service representative 110-1, and a direct connection may be created from the inbound processing software associated with one-way inbox account 106.

Figure 2:
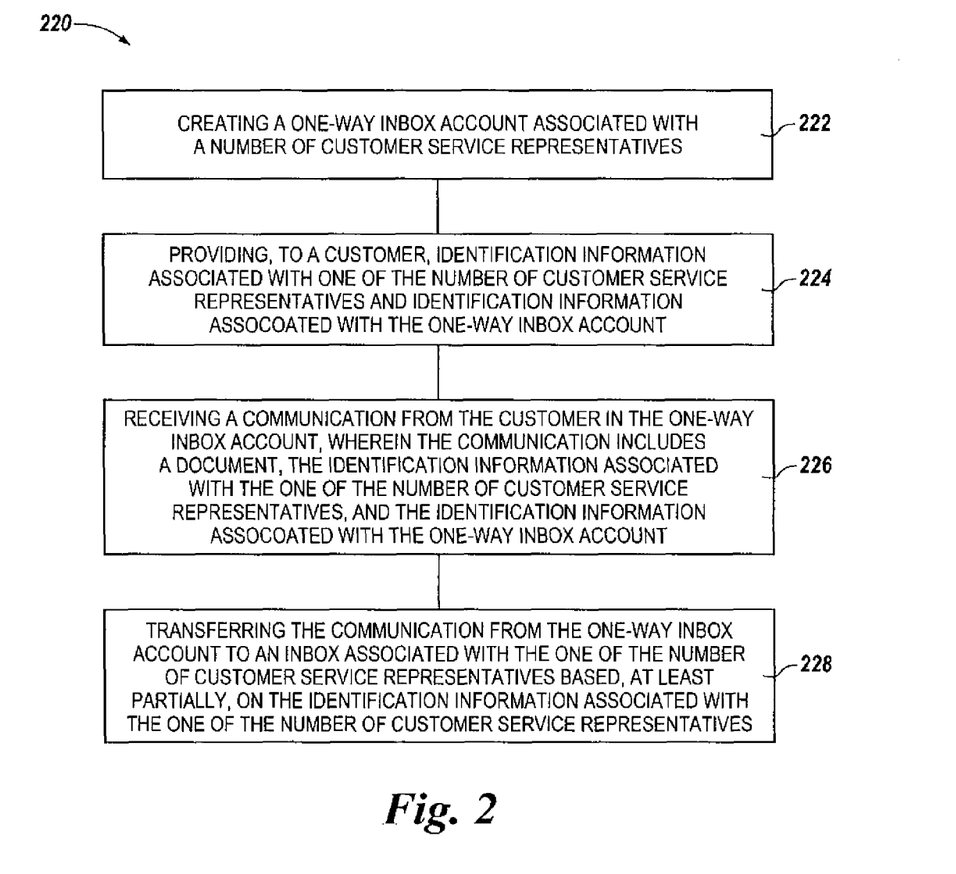
FIG. 2 illustrates a method for receiving a document from a customer in accordance with one or more embodiments of the present disclosure.

FIG. 2 illustrates a method 220 for receiving a document from a customer in accordance with one or more embodiments of the present disclosure. The document can be, for example, analogous to the document previously described in connection with FIG. 1. The customer can be, for example, customer 102 previously described in connection with FIG. 1.

At block 222, method 220 includes creating a one-way inbox account associated with a number of customer service representatives. The one-way inbox account and the number of customer service representatives can be, for example, one-way inbox account 106 and customer service representatives 110-1, 110-2, . . . , 110-N, respectively, previously described in connection with FIG. 1.

At block 224, method 220 includes providing, to a customer (e.g., customer 102), identification information associated with one of the number of customer service representatives (e.g., customer service representative 110-1) and identification information associated with the one-way inbox account. The identification information associated with one of the number of customer service representatives and identification information associated with the one-way inbox account can be, for example, analogous to the identification information previously described in connection with FIG. 1, and can be provided to the customer in a manner analogous to that previously described in connection with FIG. 1.

At block 226, method 220 includes receiving a communication from the customer in the one-way inbox account, wherein the communication includes a document, the identification information associated with the one of the number of customer service representatives, and the identification information associated with the one-way inbox account. The communication can be, for example, analogous to the communication previously described in connection with FIG. 1, and can be received in a manner analogous to that previously described in connection with FIG. 1. The document can be, for example, analogous to the document previously described in connection with FIG. 1.

At block 228, method 220 includes transferring the communication from the one-way inbox account to an inbox associated with the one of the number of customer service representatives based, at least partially, on the identification information associated with the one of the number of customer service representatives. The inbox associated with the one of the number of customer service representatives can be, for example, one of inboxes 108-1, 108-2, . . . , 108-N (e.g., inbox 108-1) previously described in connection with FIG. 1. The communication can be transferred from the one-way inbox account to the inbox associated with the one of the number of customer service representatives in a manner analogous to that previously described in connection with FIG. 1.

Figure 3:
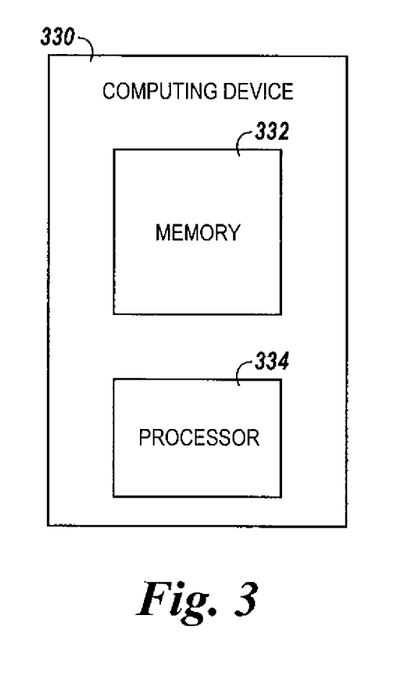
FIG. 3 illustrates a computing device for receiving a document from a customer in accordance with one or more embodiments of the present disclosure.

FIG. 3 illustrates a computing device 330 for receiving a document from a customer in accordance with one or more embodiments of the present disclosure. Computing device 330 can be, for example, the device associated with one of customer service representatives 110-1, 110-2, . . . , 110-N (e.g., customer service representative 110-1) previously described in connection with FIG. 1.

As shown in FIG. 3, computing device 330 includes a memory 332 and a processor 334. Although not illustrated in FIG. 1, memory 332 can be coupled to processor 334.

Memory 332 can be any type of storage medium that can be accessed by processor 334 to perform various examples of the present disclosure. For example, memory 332 can be a non-transitory computer readable medium having computer readable instructions (e.g., computer program instructions) stored thereon that are executable by processor 334 to perform various examples of the present disclosure. That is, processor 334 can execute the executable instructions stored in memory 332 to perform various examples of the present disclosure.

Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 332 is illustrated as being located in computing device 330, embodiments of the present disclosure are not so limited. For example, memory 330 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the disclosed embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for receiving a document from a customer, comprising:
   a memory; and
   a processor configured to execute executable instructions stored in the memory to:
   receive, in a one-way inbox account associated with a number of customer service representatives, a communication from a customer, wherein the communication includes:
      a document; and
      identification information associated with a particular customer service representative, wherein the identification information comprises a name of the particular customer service representative, a routing code associated with the particular customer service representative, or an indication of a product or service provided by the particular customer service representative; and
   transfer the communication from the one-way inbox account to an inbox associated with the particular customer service representative based, at least partially, on the identification information,
   wherein the communication is received from the customer over a first communication channel,
   wherein the communication is received from the customer and transferred to the inbox associated with the particular customer service representative while the customer and the particular customer service representative are conducting a telephone call with each other over a second communication channel, and
   wherein the one-way inbox account in configured to receive communications from customers and is not configured to send communications to customers.

2. The computing device of claim 1, wherein the processor is configured to execute the instructions to automatically transfer the communication from the one-way inbox account to the inbox associated with the particular customer service representative based, at least partially, on the identification information.

3. The computing device of claim 1, wherein the processor is configured to execute the instructions to automatically transfer the communication from the one-way inbox account to an inbox associated with an additional customer service representative based, at least partially, on the identification information.

4. A non-transitory computer readable medium having computer readable instructions stored thereon that are executable by a processor to:
   provide, to a customer, identification information associated with a customer service representative, wherein the identification information comprises a name of the customer service representative, a routing code associated with the customer service representative, or an indication of a product or service provided by the customer service representative;
   receive, in a one-way inbox account associated with a number of customer service representatives, a communication from the customer, wherein the communication includes:
      a document; and
      the identification information associated with the customer service representative; and
   transfer the communication from the one-way inbox account to an inbox associated with the customer service representative based, at least partially, on the identification information associated with the customer service representative,
   wherein the communication is received from the customer over a first communication channel,
   wherein the communication is received from the customer and transferred to the inbox associated with the particular customer service representative while the customer and the particular customer service representative are conducting a telephone call with each other over a second communication channel, and
   wherein the one-way inbox account in configured to receive communications from customers and is not configured to send communications to customers.

5. The computer readable medium of claim 4, wherein the instructions are executable to:
   receive, from the customer, identification information associated with the customer;
   authenticate the customer based, at least partially, on the identification information associated with the customer; and
   automatically transfer the communication from the one-way inbox account to the inbox associated with the customer service representative based, at least partially, on the authentication of the customer.

6. The computer readable medium of claim 4, wherein the instructions are executable to:
   provide the identification information associated with the customer service representative to a mobile device of the customer; and
   receive the communication from the mobile device of the customer.

7. The computer readable medium of claim 4, wherein the instructions are executable to:
   provide the identification information associated with the customer service representative to a computing device of the customer; and
   receive the communication from the computing device of the customer.

8. The computer readable medium of claim 4, wherein the document includes at least one of:
   a fax;
   an electronic file; and
   an email.

9. The computer readable medium of claim 4, wherein the instructions are executable to automatically transfer the communication from the one-way inbox account to an inbox associated with a particular department of a financial institution based, at least partially, on the identification information associated with the customer service representative.

10. A computer implemented method for receiving a document from a customer, comprising:
creating a one-way inbox account associated with a number of customer service representatives;
providing, to a customer, identification information associated with a particular customer service representative and identification information associated with the one-way inbox account, wherein the identification information associated with the particular customer service representative comprises a name of the particular customer service representative, a routing code associated with the particular customer service representative, or an indication of a product or service provided by the particular customer service representative;
receiving a communication from the customer in the one-way inbox account, wherein the communication includes:
a document;
the identification information associated with the particular customer service representative; and
the identification information associated with the one-way inbox account; and transferring the communication from the one-way inbox account to an inbox associated with the particular customer service representative based, at least partially, on the identification information associated with the particular customer service representative,
wherein the communication is received from the customer over a first communication channel, and
wherein the communication is received from the customer and transferred to the inbox associated with the particular customer service representative while the customer and the particular customer service representative are conducting a telephone call with each other over a second communication channel, and
wherein the one-way inbox account in configured to receive communications from customers and is not configured to send communications to customers.

11. The method of claim 10, wherein:
the identification information associated with the one-way inbox account includes an email address associated with the one-way inbox account; and
the communication from the customer is an email.

12. The method of claim 10, wherein:
the identification information associated with the one-way inbox account includes a fax number associated with the one-way inbox account; and
the communication from the customer is a fax.

13. The method of claim 10, wherein the method includes transferring the communication from the one-way inbox account to the inbox associated with the particular customer service representative by the particular customer service representative.

14. The method of claim 10, wherein the method includes automatically saving the communication based, at least partially, on the identification information associated with the particular customer service representative.

15. The method of claim 10, wherein providing the identification information associated with the particular customer service representative and the identification information associated with the one-way inbox account to the customer includes emailing the identification information associated with the particular customer service representative and the identification information associated with the one-way inbox account to the customer.

\* \* \* \* \*

UNITED STATES PATENT AND TRADEMARK OFFICE
CERTIFICATE OF CORRECTION

PATENT NO. : 9,106,585 B1  
APPLICATION NO. : 13/253581  
DATED : August 11, 2015  
INVENTOR(S) : David Patrick Dixon and Jeffrey William Gallagher Page 1 of 1

It is certified that error appears in the above-identified patent and that said Letters Patent is hereby corrected as shown below:

In the Claims

Column 9, claim 1, line 56, delete "in" and insert -- is --, therefor.

Column 10, claim 4, line 35, delete "in" and insert -- is --, therefor.

Column 12, claim 10, line 5, delete "in" and insert -- is --, therefor.

Signed and Sealed this  
Twenty-eighth Day of June, 2016

Michelle K. Lee  
*Director of the United States Patent and Trademark Office*